United States Patent [19]
Colvin et al.

[11] Patent Number: 5,804,297
[45] Date of Patent: *Sep. 8, 1998

[54] THERMAL INSULATING COATING EMPLOYING MICROENCAPSULATED PHASE CHANGE MATERIAL AND METHOD

[76] Inventors: David P. Colvin, 123 Harmony Hill La., Cary, N.C. 27513; Yvonne G. Bryant, 316 Lord Berkley Rd., Raleigh, N.C. 27610; John C. Driscoll, 7800 Netherlands Dr., Cary, N.C. 27502; James C. Mulligan, 912 Indian Trail, Raleigh, N.C. 27609

[ * ] Notice: The term of this patent shall not extend beyond the expiration date of Pat. No. 5,366,801.

[21] Appl. No.: 498,168

[22] Filed: Jul. 5, 1995

[51] Int. Cl.$^6$ .................................................. B32B 5/16
[52] U.S. Cl. ..................... 428/327; 428/332; 428/402.2; 428/402.21; 428/402.24; 428/407; 428/913
[58] Field of Search ................... 428/323, 327, 428/332, 402.2, 402.21, 402.24, 403, 407, 913

[56] References Cited

U.S. PATENT DOCUMENTS

| | | | |
|---|---|---|---|
| Re. 34,880 | 3/1995 | Salyer | 106/660 |
| 4,513,053 | 4/1985 | Chen et al. | 428/221 |
| 4,581,285 | 4/1986 | Mahefkey | 428/285 |
| 4,747,240 | 5/1988 | Voisinet et al. | 52/173 R |
| 5,224,356 | 7/1993 | Colvin et al. | 62/259.2 |
| 5,290,904 | 3/1994 | Colvin et al. | 428/68 |
| 5,366,801 | 11/1994 | Bryant et al. | 428/283 |
| 5,435,376 | 7/1995 | Hart et al. | 165/10 |
| 5,499,460 | 3/1996 | Bryant et al. | 36/43 |

Primary Examiner—H. Thi Le
Attorney, Agent, or Firm—Rosenthal & Putterman

[57] ABSTRACT

A method of insulating a substrate from repeated thermal transients and/or thermal impulses applied thereto by proximately absorbing and storing the thermal transients and/or thermal impulses for subsequent removal by radiation. According to the method, a coating is placed in energy absorbing contacting relation with the substrate. The coating includes a base material and a plurality of microcapsules dispersed within the base material. The microcapsules may be dispersed throughout the base material and may be submerged therein so that they are substantially spaced apart from one another. The microcapsules contain a thermal energy absorbing material, for example, a phase change material such a paraffinic hydrocarbons or alternatively, plastic crystals. Articles of manufacture may be produced according to the present invention which employ the above described coating.

8 Claims, 4 Drawing Sheets

THERMAL INSULATING COATING EMPLOYING MICROENCAPSULATED PHASE CHANGE MATERIAL AND METHOD

FIELD OF THE INVENTION

This invention relates generally to the field of insulative coatings and more specifically to insulative coatings that are applied to substrates in order to protect an underlying structure from thermal transients and thermal impulses.

BACKGROUND OF THE INVENTION

It is known that stresses introduced into electrical and mechanical systems decrease the reliability of such systems. Excessive amounts of thermal energy delivered during short periods of time is one type of stress that, if not effectively managed will cause a shorting of component life. For example, it is well known to cool electronic components and assemblies in order to extend their operating life and to prevent component failure. Several techniques are commonly employed to cool electronic components such as attaching the component to a heat sink which can then reject heat by means of thermal radiation and convection. Another method which is often used in combination with heat sinks is to circulate air around the component by mounting a fan or blower proximate the component to be cooled. Another method of cooling components is to surround them with potting compounds or conformal coatings which also protect them from the deleterious effects of contact with water and/or excessive shock. The potting compound is usually a semiflexible epoxy with a thixotropic agent and a curing agent added. The particular epoxy used usually depends on a number of parameters, including the thermal coefficient of expansion of the component. The thermal coefficient of expansion of the epoxy should be close to that of the electronic component so as to prevent possible breakage thereof. Other considerations are that the epoxy should be waterproof and that it not react electrically or physically with the component. It would therefore be of commercial value to formulate coating that could be applied to the exterior of an electronic component or its package that would preserve the aforementioned benefits of conventional potting compounds while still enhancing the conductance of thermal energy away from the component.

Similarly, conventional aircraft are also subjected high thermal loading, especially upon take off. In addition, vertical take-off and landing aircraft (the so-called "Jump Jets") are subjected to extremely high amounts of thermal energy upon take off and landing. The portions of the aircraft skin that are subjected to thermal transients of approximately 1700 degrees F. for approximately 15 seconds. Not surprisingly, such high performance comes at a price. The heat shielding materials are expensive and add weight to the aircraft which translates into decreased performance and increased cost. It would therefore also be of commercial value to provide a compound which could be applied to the exterior of an aircraft skin that would effectively absorb large amounts of thermal energy for subsequent conductance away from the aircraft, thereby protecting the underlying aircraft operating systems.

In addition, it would be of significant value if a passive system could be developed that would prevent bridges, roadways, aircraft wings and other structures from becoming icy during inclement weather conditions. Such as system would necessarily have to act as a thermal capacitor during periods of relative warmth and would then give up the stored thermal energy during a subsequent decrease in temperature.

It is, therefore, an object of the present invention to solve the aforementioned problems.

Another object of the present invention is to provide a thermally capacitive coating that will extend component life.

Also an object of the present invention is to provide a thermally capacitive coating that will enhance component reliability.

A related object of the present invention is to provide a thermally capacitive coating that effectively absorbs thermal impulse energy and protects the underlying system from the deleterious effects thereof.

Yet another object of the present invention is to provide a method of thermal management that is more effective than prior art methods.

A still further object of the present invention is to provide a thermally capacitive coating that is less costly than the currently available thermal management systems.

An additional object of the present invention is to provide a thermally capacitive coating that is lighter than the currently available thermal management systems.

SUMMARY OF THE INVENTION

These and other objects are accomplished by providing a method of insulating a substrate from repeated thermal transients and/or thermal impulses applied thereto by proximately absorbing and storing the thermal transients and/or thermal impulses for subsequent removal by radiation. According to the method a coating is placed in energy absorbing contacting relation with the substrate. The coating includes a base material and a plurality of microcapsules dispersed within the base material. The microcapsules contain a thermal energy absorbing material, for example, a phase change material such as paraffinic hydrocarbons or plastic crystals.

Articles of manufacture may be produced according to the present invention which incorporate the above mentioned coating.

BRIEF DESCRIPTION OF THE DRAWINGS

For a more complete understanding of this invention reference should now be had to the embodiments illustrated in greater detail in the accompanying drawings and described below by way of examples of the invention.

In the drawings.

DETAILED DESCRIPTION OF THE ILLUSTRATED EMBODIMENTS

While the present invention will be described more fully hereinafter, it is to be understood at the outset that persons of skill in the art may modify the invention herein described while still achieving the favorable results of the invention. Accordingly, the description which follows is to be understood as a broad teaching disclosure directed to persons of skill in the appropriate arts, and not as limiting upon the present invention.

Figure 1:
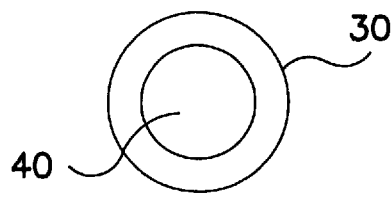
FIG. 1 is a cross section of a microcapsule containing a phase change material within a surrounding shell as employed in the present invention.
Figure 2:
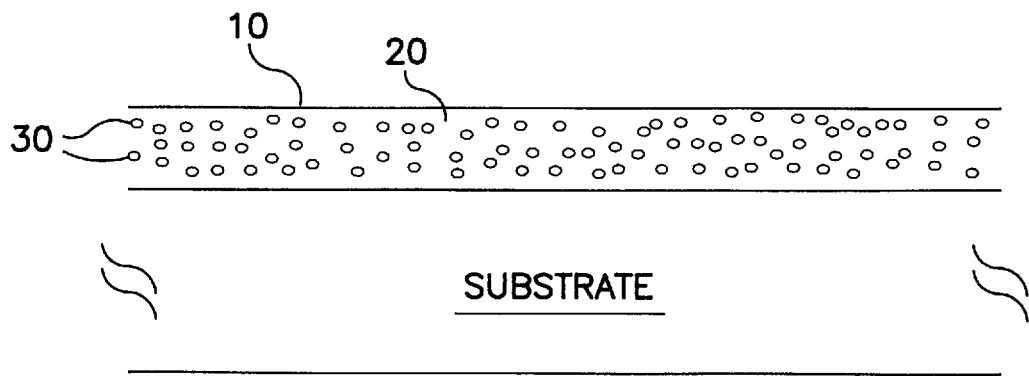
FIG. 2 is a cross section of a substrate such as an aircraft skin, road surface, bridge, electronic component, foam, glass, plastic, etc. coated with a base material loaded with microencapsulated phase change materials according to the present invention.

Referring more specifically to the drawings and particularly to FIGS. 1 and 2, a generic embodiment of the invention is there illustrated. The coating generally indicated at 10 comprises a flexible polymer binder 20, with a plurality of microcapsules 30 (FIG. 1) integral and dispersed within the polymer binder 20. The microcapsules 30 contain a temperature stabilizing means 40 as will be more fully explained hereinafter.

The polymer binder may take the form of an organic plastic, examples of which include but are not limited to polyurethane, nitrile rubbers, chloroprene rubbers, polyvinyl alcohol, silicone, ethylene/vinyl acetate copolymer, acrylic and the like.

The microcapsules can range in diameter from about 0.50 microns to about 1000 microns and are formed according to conventional methods well known to those skilled in the art.

The microcapsules contain a temperature stabilizing means or phase change material 40 such as eicosane. Additionally, plastic crystals such as 2,2-dimethyl-1,3-propanediol (DMP) and 2-hydroxymethyl-2-methyl-1,3-propanediol (HMP) and the like may be used as the temperature stabilizing means. When plastic crystals absorb thermal energy, the molecular structure is temporarily modified without changing the phase of the material.

In another aspect of the invention, the composition of the phase change material 40 may be modified to obtain optimum thermal properties for a given temperature range. For example, the melting point of a homologous series of paraffinic hydrocarbons is directly related to the number of carbon atoms as shown in the following table:

| COMPOUND NAME | # CARBON ATOMS | MELTING POINT DEG. C. |
| --- | --- | --- |
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

Each of the above materials can be seperately encapsulated and is most efficient near the melting point indicated. It will be seen from the foregoing that the effective temperature of the coating can be tailored to a specific environment by selecting the phase change materials required for the corresponding temperature and adding microcapsules containing the material to the coating.

In fabricating the coating 10, the desired microencapsulated phase change materials are added to the polymer binder (liquid, solution or dispersion), compounded, cured, sprayed, cross-linked or foamed to form a flexible (or inflexible) layer on a substrate such as an aircraft skin, concrete, roadway surfaces (such as asphalt), foam, bridge structures or building materials according to conventional methods. Typical concentrations of microencapsulated phase change material 30 added to the polymer binder range from about 30% by weight to about 80% by weight. Embedding the microcapsules directly within the polymer binder 20 adds durability as the phase change material is protected by a dual wall, the first being the wall of the microcapsule and the second being the surrounding polymer matrix itself. Thus, the phase change material is less likely to leak from the coating during its liquid phase, thus enhancing its life and adding to repeatability of thermal response.

As briefly mentioned above the substrate can be any type of structure that is subjected to repeated thermal gradients, regardless of whether said gradients are impulse or relatively gradual. For example, impulse type thermal gradients would be found in pulsed electronic components such as Pulse Power Thyristors—on the order of milliseconds or microseconds or vertical take-off and landing jets where thermal transients may have a duration on the order of 15 seconds. On the other hand; the thermal gradients may be gradual and shift over a period of hours.

For example, a bridge (or other structure) absorbs thermal energy during the daylight hours and releases or radiates the energy at night. When precipitation falls, especially in colder climates, it often freezes making roadways dangerous. A road surface incorporating the coating according to the present invention would remain above the freezing temperature for a longer period of time, thus reducing or even possibly eliminating the need for sanding/salting on some occasions. In operation, the phase change material would be selected so as to melt during the daylight hours, thus absorbing the solar energy and would freeze after having relinquished the energy so stored after sunset. The net result being that the formation of ice on the roadway would be delayed. In another application according to the present invention the coating may be applied to aircraft wings to avoid or delay the need for deicing.

Figure 3:
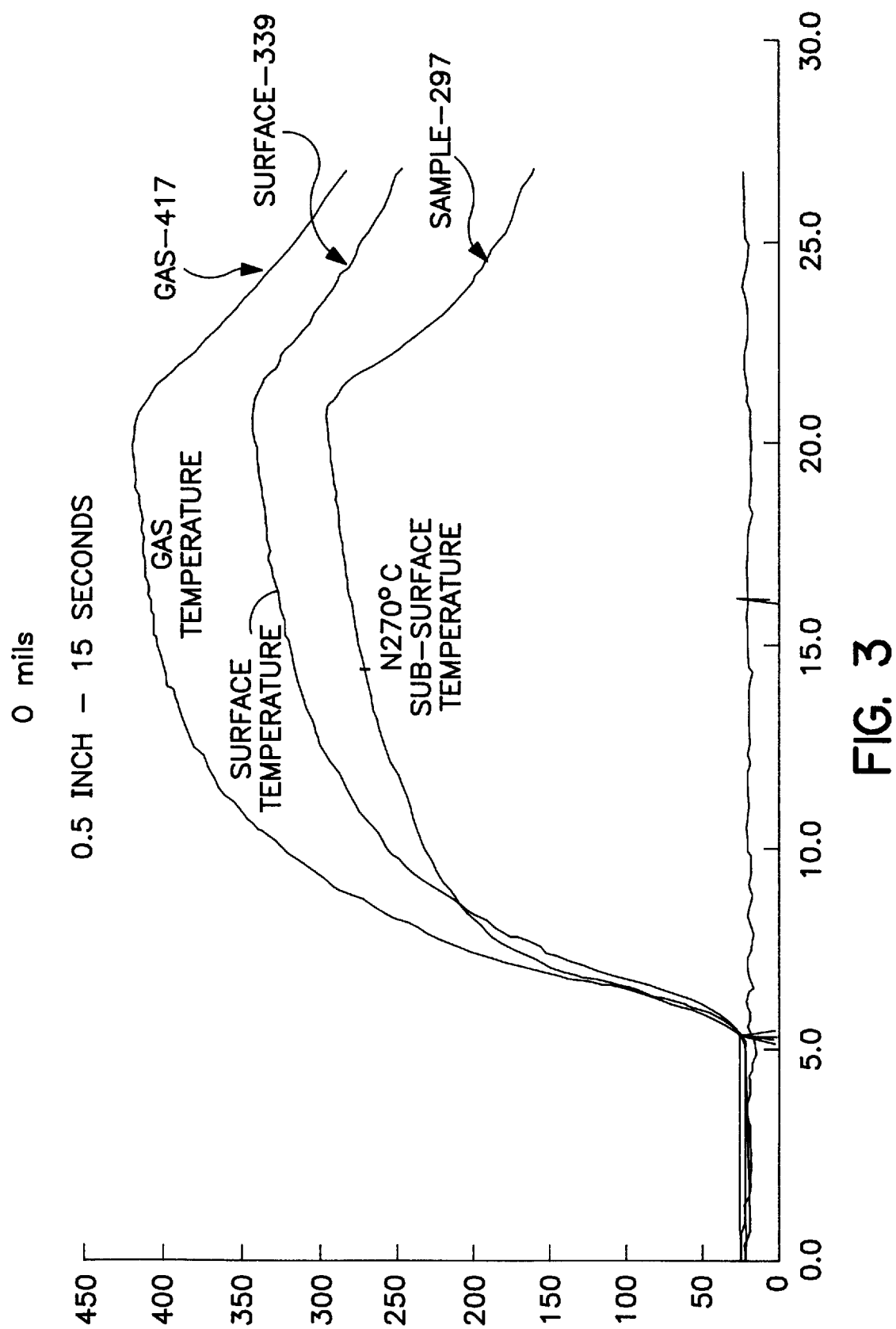
FIG. 3 is a graph that illustrates an uncoated contol sample of aircaraft skin.
Figure 4:
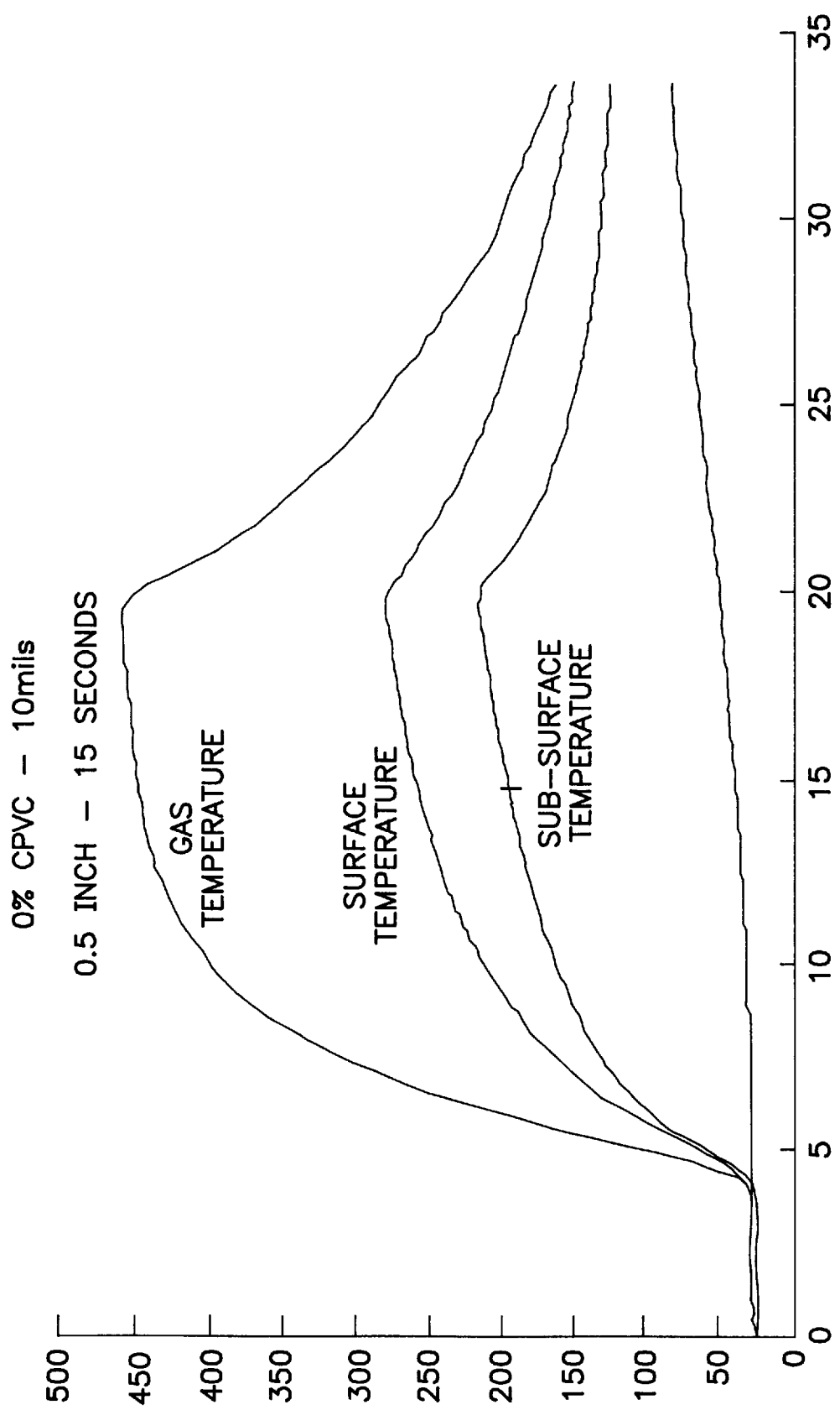
FIG. 4 is a graph that illustrates the heating of a sample of aircraft skin coated with a 10 mil thick coating of binder material only.
Figure 5:
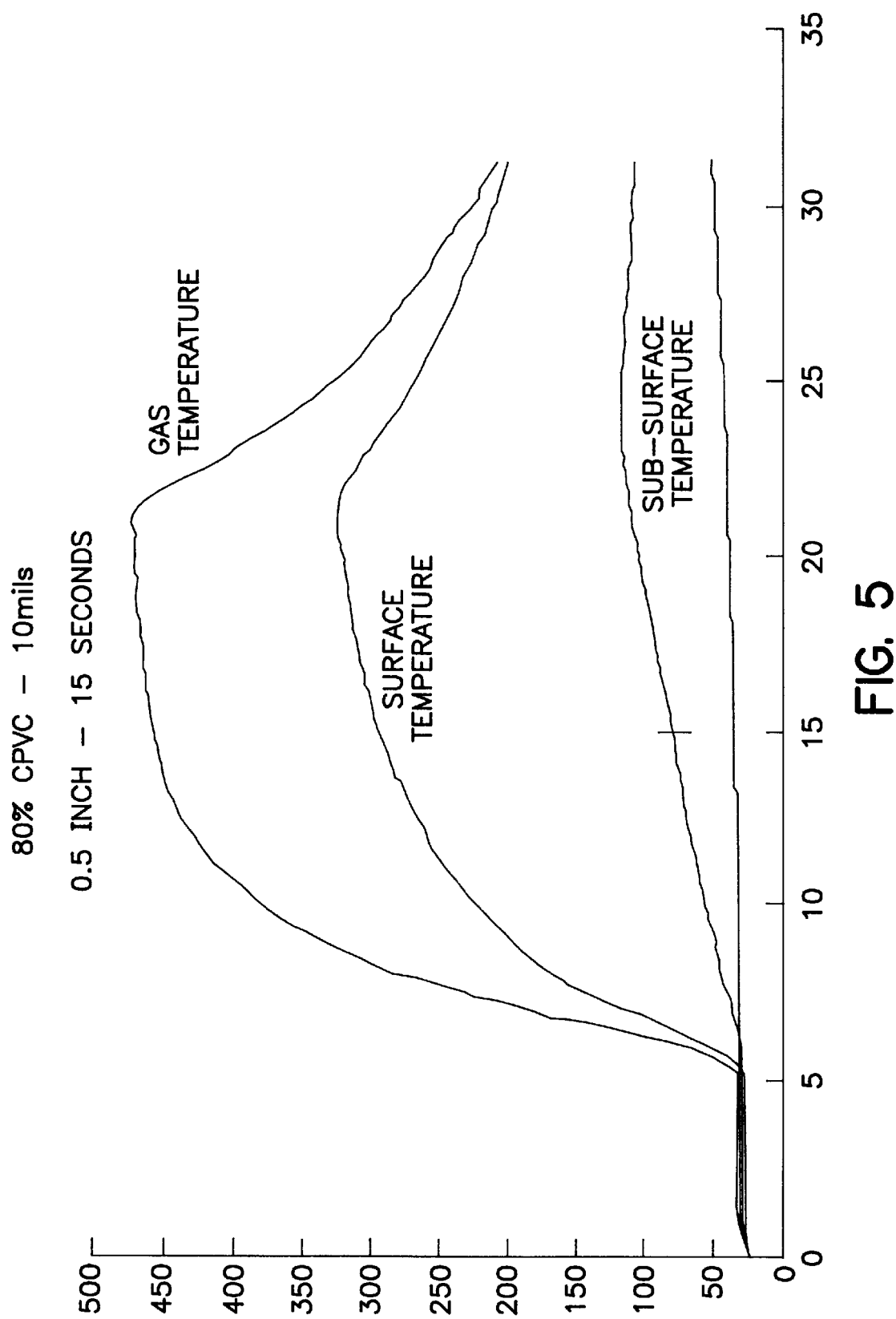
FIG. 5 is a graph that illustrates the heating of a sample of aircraft skin coated with a 10 mil thick coating of binder in combination with microencapsulated phase change material dispersed therein.

In a related application, a high melting point phase change material or plastic crystals may be employed on the underside of the vertical take-off and landing jets. The coating would protect the underside of the aircraft from the hot exhaust gasses. In experiments that were conducted a coating employing Polywax 655 as the microencapsulated phase change material was sprayed on to a section of aircraft skin. Coating thicknesses ranged from 0.010 inch to 0.100 inch and were heated to approximately 500 degrees F. for 15 seconds. The same heating was also applied to equivalent control samples with no coatings and coated controls that contained no microencapsulated phase change materials. The experimental results are shown in FIGS. 3 through 5. FIG. 3 illustrates the heating of an uncoated (0 mils) control sample that was subjected to hot gasses at 400 degrees C. 0.50 inch away for up to 20 seconds. The top curve illustrates the gas temperature, the second line is the surface temperature and the third curve is the temperature immediately under the coating as measured by a miniature thermocouple. In 15 seconds, the temperature of the uncoated sample had reached 270 degrees C. FIG. 4 illustrates the heating of a 10 mil coated sample under the same conditions. The coating was a urethane binder material without any microencapsulated phase change materials. In 15 seconds, the temperature immediately below the surface (shown by the third line from the top) had reached 190 degrees C. Thus, it will be seen that the 0.0100 inch urethane coating itself is able to provide some degree of protection. FIG. 5 is the curve for a 0.010 inch coating containing microencapsulated phase change materials at an eight per cent Critical Pigment Volume Concentration (PVC) loading fraction. The PVC is the industry designation of loading concentration for coatings. Eighty per cent PVC is equivalent to approximately 60 per cent by volume or 59 per cent by weight. Under the same experimental conditions, FIG. 5 shows how the temperature immediately below the surface reaches only 80 degrees C. after 15 seconds of heating. In fact, as the figure illustrates, the subsurface temperature reached only 100 degrees C. after 20 seconds of heating. This enhanced thermal protection means that a very thin coating of microencapsulated phase change materials can reduce the sample surface temperature over 70 percent, from 270 degrees C. to 80 degrees C. for the same level of heating.

With respect to the cooling of pulsed electronic components, it is believed that results similar to those obtained above in connection with aircraft skin will be obtained, thus enhancing component reliability and longevity.

The invention has been described in detail with particular reference to preferred embodiments and the operation thereof, but it is understood that variations, modifications, and the substitution of equivalent materials and mechanisms can be effected within the spirit and scope of this invention.

That which is claimed is:

1. An article having enhanced insulative properties from repeated thermal gradients and transients consisting essentially of:
    a substrate selected from the group consisting of aircraft skin, electronic component packages, foams, roadway surfaces, concrete, asphalt, bridge structures, and building materials;
    a coating covering at least a portion of the surface of said substrate and comprising:
        a polymeric binder, and
        a plurality of microcapsules dispersed throughout and submerged within said polymeric binder so as to be surrounded thereby, said microcapsules containing a temperature stabilizing means selected from the group consisting of phase change materials and plastic crystals,
    whereby the article exhibits enhanced insulation from thermal gradients and transients.

2. An article according to claim 1 wherein said phase change materials comprise a material selected from the group of paraffinic hydrocarbons.

3. The article according to claim 2 wherein the paraffinic hydrocarbon is selected from the group consisting of n-Octacosane, n-Heptacosane, n-Hexacosane, n-Pentacosane, n-Tetracosane, n-Tricosane, n-Docosane, n-Heneicosane, n-Eicosane, n-Nonadecane, n-Octadecane, h-Heptadecane, n-Hexadecane, n-Pentadecane, n-Tetradecane, and n-Tridecane.

4. The article according to claim 2 wherein the paraffinic hydrocarbon has a melting point between −5.5 degrees Centigrade and 61.4 degrees Centigrade.

5. An article according to claim 1 wherein said microcapsules range in diameter from about 0.5 to 1,000 microns.

6. An article according to claim 1 wherein a first preselected portion of said microcapsules contain a first temperature stabilizing means and the remainder of said microcapsules contain a second temperature stabilizing means.

7. An article according to claim 1 wherein said polymeric binder is selected from the group consisting of polyurethane, nitrile rubber, chloroprene rubber, polyvinyl alcohol, silicone, ethylene/vinyl acetate copolymer, and acrylic.

8. An aircraft skin consisting essentially of, in combination:
    (a) a substantially rigid structural skin substrate; and
    (b) a polymer directly coating and covering at least a portion of said structural skin substrate, a plurality of microcapsules dispersed throughout said polymer so as to be covered and surrounded thereby, said microcapsules containing a temperature stabilizing means selected from the group consisting of phase change materials and plastic crystals,
    whereby the aircraft skin exhibits enhanced insulation from thermal gradients and transients.

* * * * *